United States Patent
Ng et al.

(10) Patent No.: US 10,732,738 B2
(45) Date of Patent: Aug. 4, 2020

(54) SYSTEM MODULE OF CUSTOMIZING SCREEN IMAGE BASED ON NON-INVASIVE DATA-EXTRACTION SYSTEM, AND METHOD THEREOF

(71) Applicant: ADLINK TECHNOLOGY INC., New Taipei (TW)

(72) Inventors: Chua-Hong Ng, New Taipei (TW); Chao-Tung Yang, New Taipei (TW); Wei-Hung Chen, New Taipei (TW); Tsan-Ming Yu, New Taipei (TW); Shih-Hsun Lin, New Taipei (TW); Yang-Chung Tseng, New Taipei (TW); Chih-Fu Hsu, New Taipei (TW); Chien-Hsun Tu, New Taipei (TW); Te-Cheng Chiu, New Taipei (TW); Yi-Wei Lin, New Taipei (TW); Jen-Chi Hsu, New Taipei (TW)

(73) Assignee: Adlink Technology Inc., New Taipei (TW)

( * ) Notice: Subject to any disclaimer, the term of this patent is extended or adjusted under 35 U.S.C. 154(b) by 98 days.

(21) Appl. No.: 16/040,972

(22) Filed: Jul. 20, 2018

(65) Prior Publication Data
US 2019/0056796 A1    Feb. 21, 2019

(30) Foreign Application Priority Data
Aug. 17, 2017   (TW) .............................. 106128003 A

(51) Int. Cl.
*G06F 3/038*    (2013.01)
*G06F 3/023*    (2006.01)
(Continued)

(52) U.S. Cl.
CPC ........... *G06F 3/038* (2013.01); *G05B 19/042* (2013.01); *G06F 3/023* (2013.01); *G06K 9/3233* (2013.01); *G05B 2219/23258* (2013.01)

(58) Field of Classification Search
CPC . G06F 3/038; G06F 3/023; G06F 3/14; G06F 3/02; G05B 19/042; G05B 2219/23258; G06K 9/3233
See application file for complete search history.

(56) References Cited

U.S. PATENT DOCUMENTS

| | | | |
|---|---|---|---|
| 8,646,000 B2 * | 2/2014 | Kang | G06F 3/0482 345/633 |
| 2009/0153587 A1 * | 6/2009 | Kang | G06T 19/006 345/632 |

(Continued)

*Primary Examiner* — Rodney Amadiz
(74) *Attorney, Agent, or Firm* — Muncy, Geissler, Olds & Lowe, P.C.

(57) ABSTRACT

A system module of customizing a screen image based on a non-invasive data-extraction system, and a method thereof are disclosed. The system module is applicable to a machine controller controlling a machine, and sensors are disposed around the machine. In the system module, an image capture device receives an image of an original screen from the machine controller, and transmits the image to the non-invasive data-extraction system for extracting information, and a software control system integrates data measured by the sensors with the information, and combined the integration result with a customized screen image, and an extra control component is embedded in an original operation screen of the machine controller. The customized screen image is shown on the machine controller to display information by more visual manner. Furthermore, the signal receiving device and an HID simulation device can be used to provide a basic function of a KVM switch.

9 Claims, 3 Drawing Sheets

(51) Int. Cl.
*G06K 9/32* (2006.01)
*G05B 19/042* (2006.01)

(56) References Cited

U.S. PATENT DOCUMENTS

| | | | | |
|---|---|---|---|---|
| 2011/0138317 A1* | 6/2011 | Kang | ................... | G06F 3/011 |
| | | | | 715/780 |
| 2012/0299846 A1* | 11/2012 | Matsuda | ............... | G06F 3/0488 |
| | | | | 345/173 |
| 2015/0317120 A1* | 11/2015 | Kim | ................... | G06F 3/1431 |
| | | | | 345/1.3 |
| 2019/0370954 A1* | 12/2019 | Abe | ................... | G06T 7/60 |

* cited by examiner

SYSTEM MODULE OF CUSTOMIZING SCREEN IMAGE BASED ON NON-INVASIVE DATA-EXTRACTION SYSTEM, AND METHOD THEREOF

This application claims the priority benefit of Taiwan patent application number 106128003, filed on Aug. 17, 2017.

BACKGROUND OF THE INVENTION

1. Field of the Invention

The present disclosure relates to a system module of customizing a screen display based on a non-invasive data-extraction system, and a method thereof; more particularly, the non-invasive data-extraction system can extract the information of the original screen image of the machine outputted from the machine controller, and the system module combines the information with the customized screen and outputs the customized screen, so as to add an extra interactive operation interface on the existing operation screen.

2. Description of the Related Art

In recent years, manufacturing industries are now facing a shortage of labor and rising awareness of environmental protection, increasing of labor and operating costs, and the pressure of transforming from labor-intensive industries to technical-intensive labor-intensive industries. Most of the manufacturing industries are aided by production-line automation technology and fixtures, so as to reduce manpower and working hours, and increase production capacity. Furthermore, in the automatic production line, different processing apparatuses or machines are disposed in different workstations of the plant site to perform production flows of processing, inspection, cleaning, assembly, quality control, warehousing and transportation, thereby producing the required components and finished products.

Furthermore, with the development of automation technology in production-line, machine with higher productivity and an open architecture must be used to meet the operational demand. Therefore, manufacturers have developed various industrial computers applicable for industrial control and used for control between the machine of the automation apparatus and a master device However, in the manufacturing process with the automation apparatus, it is hard to upgrade the old machine controller to a networked device. For example, it is difficult to upgrade the machine controller in expansion of hardware equipment and software system modifications; for this reason, in order to maintain the normal operation of such old machines, most of the manufacturers use a non-invasive data-extraction system to obtain the information of the control machine.

Please refer to FIG. 3, which is a schematic view of a structure of a conventional non-invasive data-extraction system. In the conventional non-invasive data-extraction system, a screen image outputted from the machine controller is served as a data source, and the screen image is also transmitted to the data-extraction system and shown on the displayer of the machine controller, so that the image recognition process can be performed for region of interest (ROI) extraction and optical character recognition (OCR) to convert the information shown on the screen image into digital information. The machine controller can be switched, by a KVM switch, to control the data-extraction system or the keyboard/mouse of the machine controller; however, the required information may be shown on different operation screens of the machine controller, so the site working staff must quickly switch the operation screen of the machine controller to extract the machine state and data. As a result, when the data-extraction system is in operation, the site working staff is unable to switch the operation screen of the machine controller to check the machine state and data in real time, and it causes the limitation in function of overall system. Therefore, what is needed is to develop a system module to solve above-mentioned problem.

SUMMARY OF THE INVENTION

In order to solve above-mention that the site working staff is unable to check the machine state and data while the conventional data-extraction system extracts the screen data of the machine controller, the inventor develops, according to collected data, years of experience and multiple tests, a system module and a method thereof based on the non-invasive data-extraction system to customize a screen image.

An objective of the present invention is to provide a system module based on a non-invasive data-extraction system and electrically connected to a machine controller, and the machine controller is used to control a machine which is provided with a plurality of sensors disposed inside and outside thereof. The system module includes an image capture device configured to receive an original screen image of a machine control program outputted by the machine controller, and transmit the original screen image to the non-invasive data-extraction system for extraction of the information shown in the original screen image of the machine. The system module includes a software control system including a setting program configured to integrate the data measured by the sensors with the information of the screen image of the machine, and combine the integration result with a customized screen, and embed an extra control component in an original operation screen of the machine control program outputted from the machine controller; and an image output device configured to output the customized screen image to a displayer of the machine controller or the operation screen of the machine. Compared with the original operation screen of the machine control program, the system module of the present invention can display the machine information by a more visual manner, so as to solve the problem that it is hard to modify the screen of the old machine. Furthermore, the software control system can use the signal receiving device and an HID simulation device to provide a basic function of a KVM switch, thereby allowing the site working staff to view the machine state and data in real time.

Another objective of the present invention is that the software control system can use the signal receiving device and the HID simulation device to provide the basic function of the KVM switch, and while the non-invasive data-extraction system extracts the screen data of the machine, the site working staff can operate the system module through the machine controller to show the customized screen image, so that the site working staff can view the data shown on the customized screen image, for example, the site working staff can browse the data shown on the operation screen, view the machine state and data in real time, thereby improving the production efficiency and reduce the maintenance cost of the machine. When the site working staff needs to operate the machine controller to troubleshoot or solve error condition, the non-invasive data-extraction system can pause and forward the keyboard/mouse input command received from the software control system, to the machine control program of the machine controller.

The other objective of the present invention is that while the non-invasive data-extraction system extracts the information, the software control system can combine the information of the original screen image of the machine outputted from the machine controller with the customized screen image, and then the image output device can output the customized screen image to the machine controller for the site working staff to view the data in real time; furthermore, the original operation screen of the machine can be embedded with an extra control component by, for example, the OSD menu interface manner, so as to provide an extra interactive operation interface on the existing operation screen of the machine.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
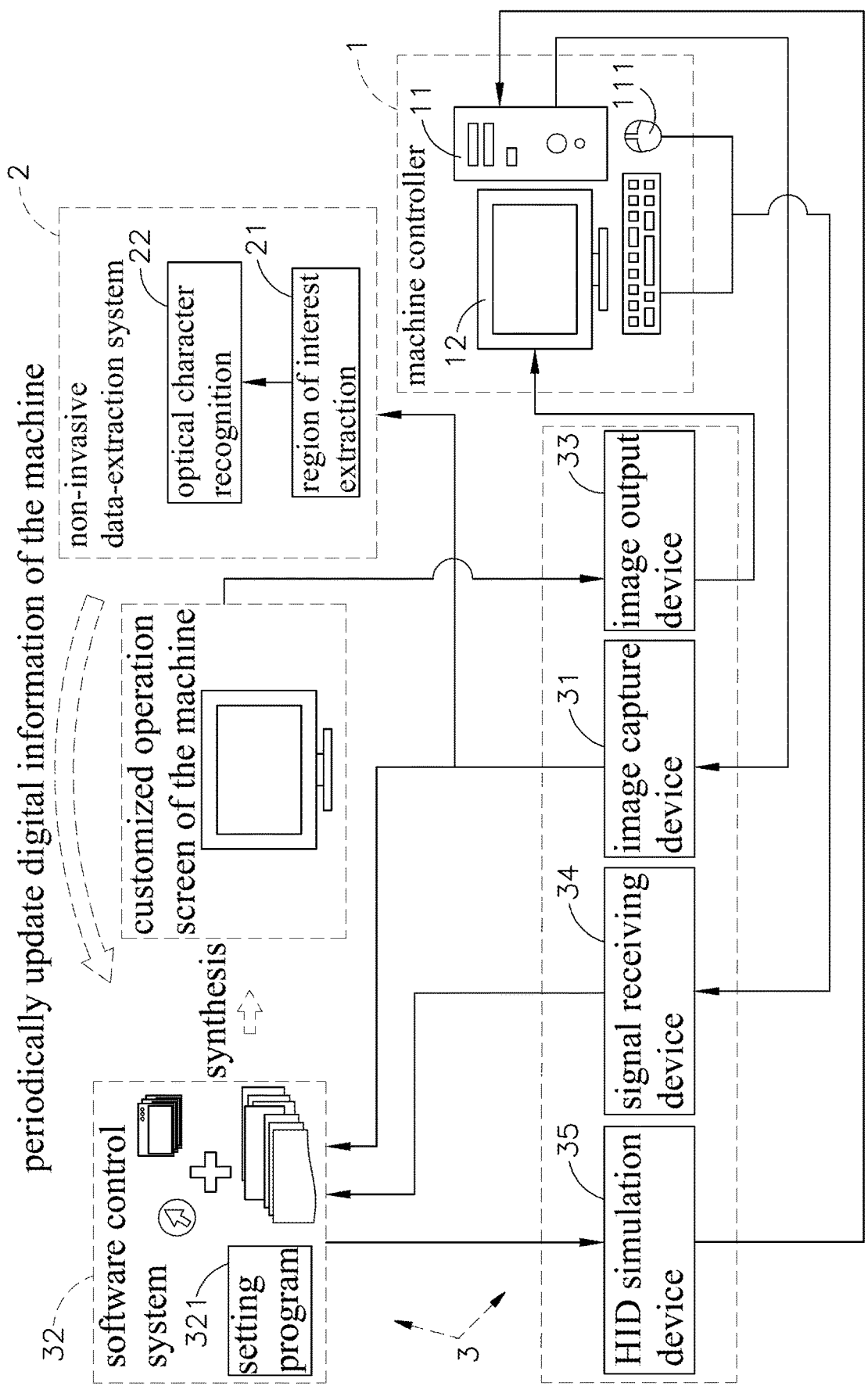
FIG. 1 is a block diagram showing a system module extracting data of the machine controller through the non-invasive data-extraction system to output the customized screen image, in accordance with the present invention.

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

Figure 2:
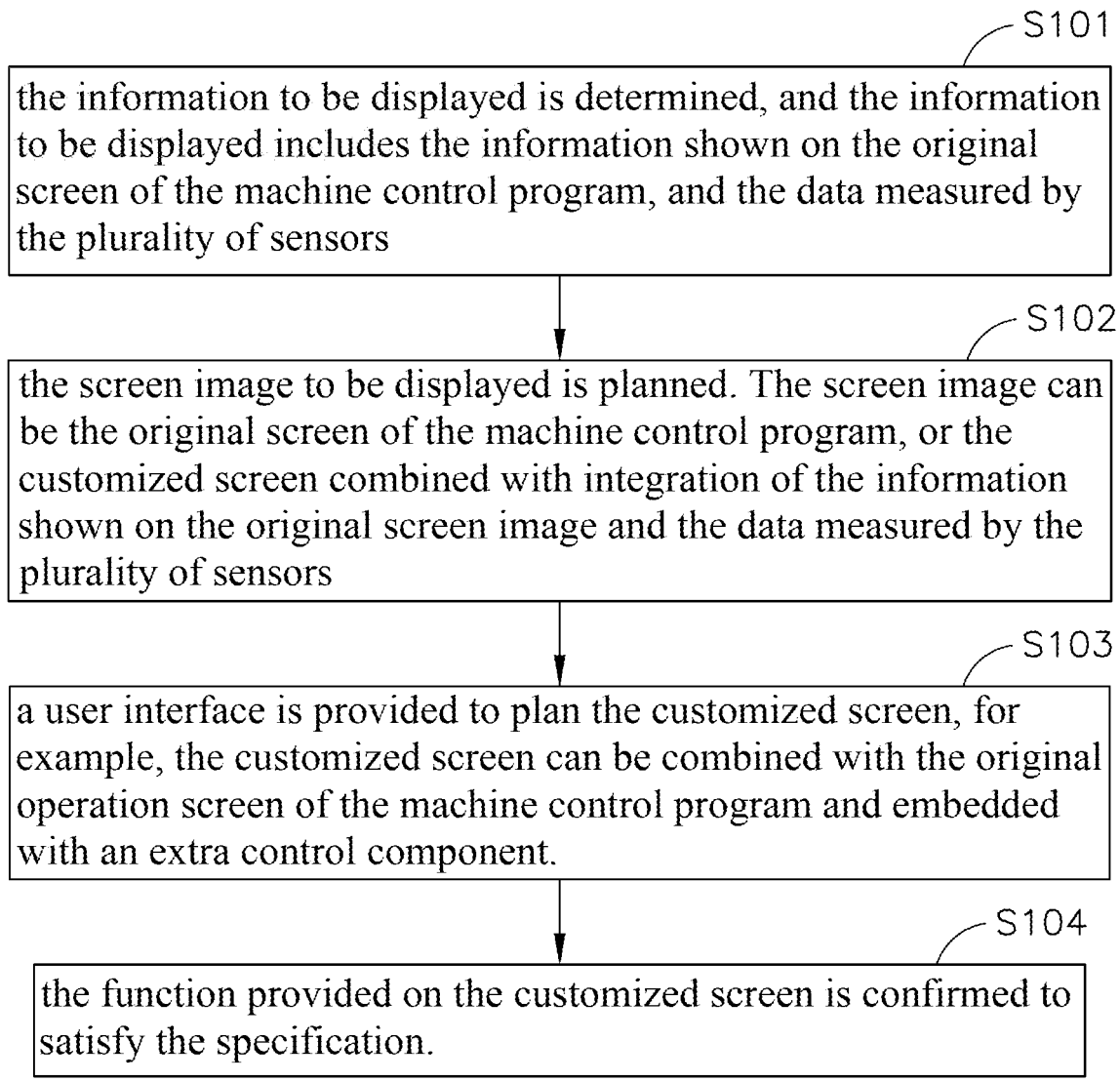
FIG. 2 is a flowchart showing the steps in an operation of the system module setting the customized screen image, in according with the present invention.
Figure 3:
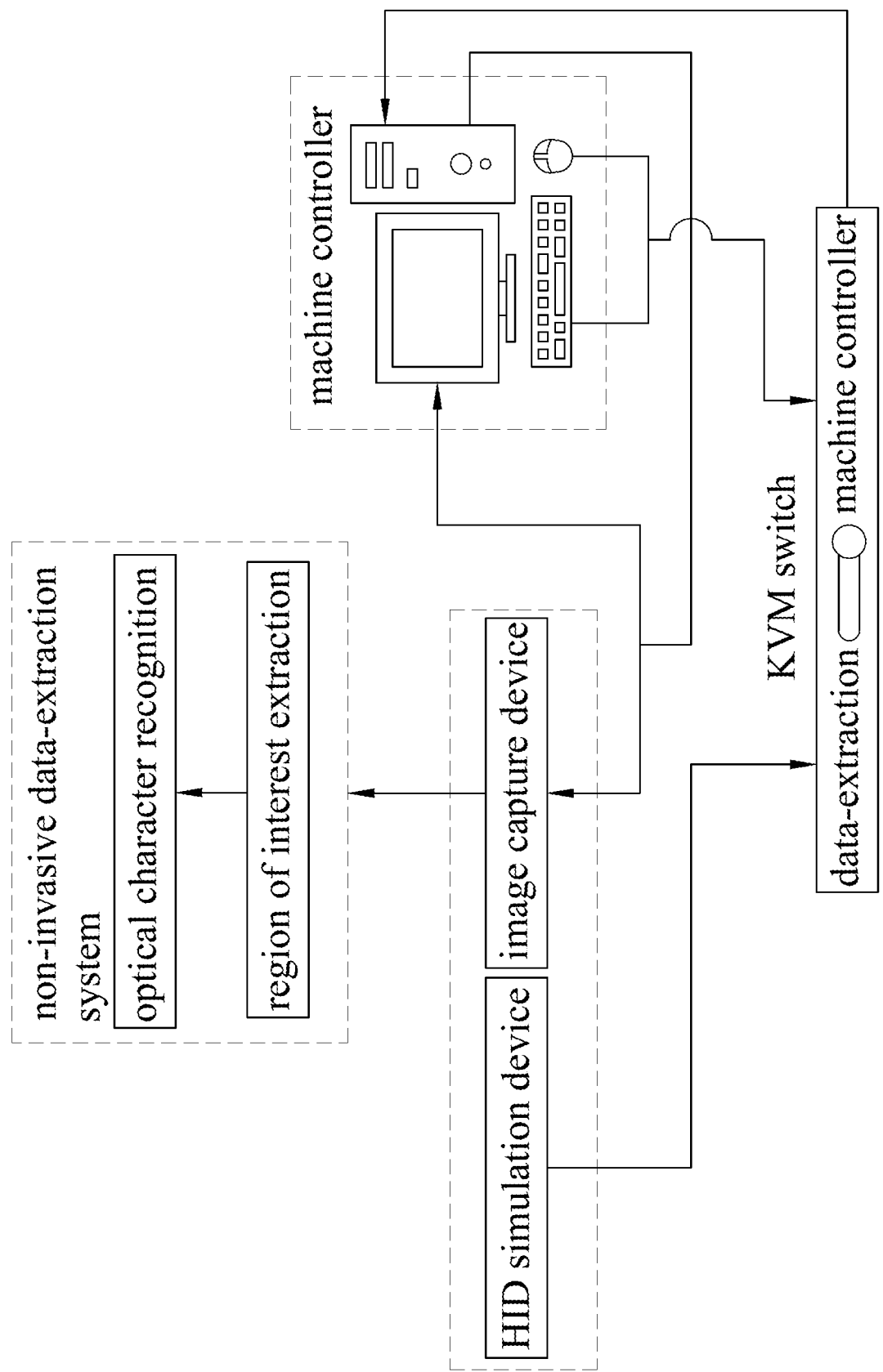
FIG. 3 is a schematic view of a structure of a conventional non-invasive data-extraction system.

Please refer to FIGS. 1 and 2, which are block diagram showing the system module extracting the data of the machine controller through the non-invasive data-extraction system to output a customized screen image, and a flowchart showing the steps in an operation of the system module setting the customized screen image, in accordance with an embodiment of the present invention. According to a main concept of the present invention, the system module and method thereof are based on (or, in cooperation with) the non-invasive data-extraction system to output the customized screen image, and can be applicable to a machine controller 1. The machine controller 1 is electrically connected to, but not limited, a desktop computer, a workstation, a server, a notebook computer or other console configured to control operation of a machine. The machine controller 1 includes a host computer 11 electrically connected to a screen 12 and a keyboard/mouse 111.

In this embodiment, a reflow oven of SMT apparatus is taken as an example of the machine electrically connected to the machine controller 1, but the actual application of the present invention is not limited thereto. In other embodiment, the machine may be automation equipment or processing machine used in semiconductor industry, a printed circuit board industry, precision electronics industry or optoelectronics industry, machinery manufacturing industry. The machine controller 1 can use a plurality of sensors disposed inside and outside of the machine, to collect the data associated with machine operation and production status, for controlling the machine in real time or monitoring the production efficiency of the machine. Furthermore, the screen 12 of the machine controller 1 can show the original screen of the machine, and the detailed description will be described below.

The machine controller 1 is electrically connected to a system module 3 which is based on (that is, in cooperation with) an non-invasive data-extraction system 2. The system module 3 includes an image capture device 31, a software control system 32, an image output device 33, a signal receiving device 34 and an HID simulation device 35. The software control system 32 can drive the image capture device 31 to receive an image of the original screen of the machine control program output by the machine controller 1 and transmit the image to the non-invasive data-extraction system 2 as an image source for the OCR software. The non-invasive data-extraction system 2 can perform an ROI extraction 21 and an OCR 22 on the received image, to convert the information displayed on the image into digital information.

However, the non-invasive data-extraction system 2 is mainly used for extracting the information shown on the screen of the machine, and a setting program 321 built in the software control system 32 of the system module 3 is configured to process the digital information generated by the non-invasive data-extraction system 2. The setting program 321 can select all or a part of the digital information and integrate the data measured by the plurality of sensors disposed inside and outside of the machine with the digital information extracted from the image of the original screen, and combine the customized screen image which is post-processed already, with an original operation screen of the machine control program. For example, the original operation screen can be added with the effects of mouse-moving and keyboard input; furthermore, upon design or use demand, a control component such as a dialog box, a button or a data list can be embedded in the original operation screen, and the control component can be linked to a specific processing function. As a result, the original operation screen of the machine control program can be added with an extra interactive operation interface, so as to show different customized screen by the image synthesis manner. The image output device 33 outputs to the customized screen image to the screen 12 of the machine controller 1 or the original operation screen of the machine. In an embodiment, the non-invasive data-extraction system 2 can periodically provide updated digital information of the machine.

Furthermore, the signal receiving device 34 is configured to receive the control signal inputted from physical keyboard/mouse 111 of the host computer 11, and transmit the control signal to the image output device 33 through an HID data buffer and the HID detection/data forward function, for processing. The HID simulation device 35 can use a microcontroller of the software control system 32 to simulate the keyboard/mouse to transmit the corresponding control signal, and the control signal is temporarily stored in the HID data buffer. The HID detection/data forward function can be performed to respond the control signal inputted from the keyboard/mouse according to mouse moving position and the mouse-clicking position, and transmit the control signal to the software control system 32 for processing. The command contained in the control signal can be used for the embedded control component, and the HID simulation device 35 can transmit the control signal generated by the software control system 32 in response to the keyboard input, the mouse moving position and mouse-clicking on the control component to the host computer 11 of the machined controller 1, so that the software control system 32 can use the signal receiving device 34 and the HID simulation device 35 to provide the basic KVM switching function.

In a case that the method of customizing the screen image based on the non-invasive data-extraction system is applicable to the machine controller 1, the system module 3 can be used to set the operational flow of setting the customized screen, and the method includes following steps S101 to S104.

In the step S101, the information to be displayed is determined, and the information to be displayed includes the information shown on the original screen of the machine control program, and the data measured by the plurality of sensors.

In the step S102, the screen image to be displayed is planned. The screen image can be the original screen of the machine control program, or the customized screen combined with integration of the information shown on the original screen image and the data measured by the plurality of sensors.

In the step S103, a user interface is provided to plan the customized screen, for example, the customized screen can be combined with the original operation screen of the machine control program and embedded with an extra control component.

The step S104 is a function confirmation step. In the step S104, the function provided on the customized screen is confirmed to satisfy the specification.

According to the steps of the aforementioned embodiment, the system module 3 of the present invention is based on (that is, in cooperation with) the non-invasive data-extraction system 2, and use the non-invasive data-extraction system 2 to extract the information of the original screen outputted from the machine control program. In order to integrate the machine information extracted from the non-invasive data-extraction system 2, the software control system 32 can include the setting program 321 configured to provide a site working staff to select the machine information to be displayed and combined with the customized screen image, the non-invasive data-extraction system 2 can periodically provide the machine information, and the customized screen can show the selected machine information, thereby displaying the real-time data for the site working staff. The software control system 32 can embed the specific control component in the existing original operation screen of the machine control program and link the control component with the specific processing function, so that the extra interactive operation interface can be added in the existing original operation screen of the machine control program.

In this embodiment, the system module 3 is based on the structure of the non-invasive data-extraction system 2. When the non-invasive data-extraction system 2 extracts the information of the original screen outputted from the machine controller 1, the non-invasive data-extraction system 2 can use the software control system 32 to combine the information with the customized screen image, and the image output device 33 outputs the combination result to the machine controller 1. Different from the original operation screen of the machine control program, the combined image can display the machine information, so that the site working staff can view the data in real time; furthermore, an extra operation interface different from the existing machine control program can be added in the original operation screen of the machine, for example, by a similar OSD menu interface manner, the original operation screen of the machine can be embedded with extra control component such as dialog box, and link the specific processing function with the control component. As a result, the existing operation screen can be added with extra interactive operation interface.

In an embodiment, the screen image shown on the screen 12 of the machine controller 1 can be the original screen of the machine, the non-invasive data-extraction system 2 extracts the data shown on the screen image, and perform the image recognition on the screen image to convert the data to the digital information. The screen image of an old machine may show the basic data only, such as the operational temperature shown by digits, and it is hard to modify the original screen image of the old machine when the machine information is required to display in a more visual manner, for example, a temperature table header with warning indication. In this case, the system module 3 of the present invention can be in cooperation with the non-invasive data-extraction system 2 to provide the customized screen image to display the data for the site working staff by the more visual manner. For example, the data shown on the screen image of the machine can be converted to the digital information first, and the selected machine information can be displayed by a dashboard manner; alternatively, the integration of the 3D model of the machine with images of the sensors disposed around the machine and the data measured by the sensors can be combined with the digital information extracted from the original screen image, It should be noted that the dashboard or 3D model are examples for illustration of the customized screen image, but claim scope of the present invention is not limited thereto. For example, the reflow oven of the SMT apparatus may be provided with twelve temperature sensors disposed at different positions, and the actual temperature measured by the temperature sensors can be marked on the customized 3D model of the reflow oven at the areas corresponding to the positions of the temperature sensors.

Furthermore, when the site working staff operates the keyboard/mouse 111 of the host computer 11, the signal receiving device 34 can receive the control signal inputted from the physical keyboard/mouse 111, and transmit the control signal to the software control system 32 for processing. When the signal receiving device 34 receives the command inputted from keyboard, the primary program of the software control system 32 can perform input operation according to the keyboard pressing; when the signal receiving device 34 receives the command of mouse moving, the primary program of the software control system 32 updates the position of the mouse cursor according to movement of the mouse; when the signal receiving device 34 receives the command of mouse clicking, the primary program of the software control system 32 transmits the current position of the mouse and the command of mouse clicking to the primary program for processing. The HID simulation device 35 can transmit the control signal, which is generated by the software control system 32 in response to the keyboard input, the position of the mouse cursor and the operation of mouse clicking the control component to the host computer 11.

Compared to the conventional non-invasive data-extraction system which must use the KVM switch to switch the operation screens of the machine controller, the software control system 32 of the present invention can use the signal receiving device 34 and the HID simulation device 35 to provide the basic function of the KVM switch. When the non-invasive data-extraction system 2 extracts the data shown on the screen image of the machine, the site working staff can normally operate the system module 3 through the machine controller 1, and the customized screen can be displayed for the site working staff to view; for example, the site working staff can browse different data shown on different operation screens, and check machine state and data in real time, thereby improving production efficiency and reduce maintenance cost of the machine. When the site working staff needs to operate the machine controller 1, for example, to troubleshoot or solve error condition, the non-invasive data-extraction system 2 can pause and forward the input command of the keyboard/mouse 111 received by the software control system 32 to the machine control program of the machine controller 1.

To summarize, the main concept of the present invention is that the machine controlled by the machine controller 1 is provided with the plurality of sensors disposed inside and outside of the machine, and the machine controller 1 is electrically connected to the system module 3 based on (that is, in cooperation with) the non-invasive data-extraction system 2, and the image capture device 31 of the system module 3 can receive the original screen image of the machine control program outputted from the machine controller 1, and transmit the original screen image to the non-invasive data-extraction system 2 to extract the information shown on the screen image of the machine; next, the software control system 32 can integrate the data measured by the sensors and the information shown on the original screen image, and combine the integration result with the customized screen image, and embed the extra control component in the original operation screen of the machine control program outputted from the machine controller 1, and the image output device 33 can output the customized screen image to the machine controller 1. Compared with the original operation screen of the machine control program, the system model of the present invention can display the machine information by the more visual manner, and the software control system 32 can provide the basic function of the KVM switch provided by using the signal receiving device 34 and the HID simulation device 35, so that the site working staff can check the machine state and data in real time.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A system module for customizing a screen image based on a non-invasive data-extraction system, and applicable to a machine controller, wherein the machine controller is configured to control a machine, and a plurality of sensors are disposed inside and outside of the machine, the machine controller is electrically connected to a system module, wherein the system module are configured to:

receive an image of an original screen of a machine control program outputted by the machine controller and transmit the image of the original screen to a non-invasive data-extraction system for extracting information shown on the image of the original screen;

integrate data measured by the sensor with the information shown on the image of the original screen, and add an extra control component in the original operation screen of the machine control program, outputted from the machine controller, by combining a customized screen;

output an image of the customized screen to the machine controller;

transmit a keyboard/mouse control signal inputted by the machine controller to the software control system for processing; and simulate the keyboard/mouse to transmit a corresponding control signal to the machine controller.

2. The system module according to claim 1, wherein the machine controller is electrically connected to a host computer, and the host computer is electrically connected to a screen and the keyboard/mouse.

3. The system module according to claim 1, wherein the non-intrusive data-extraction system is configured to receive the original screen image of the machine control program outputted from the machine controller, and extract a region of interest extraction from the original screen image, and perform optical character recognition to convert the information displayed on the original screen image to digital information.

4. The system module according to claim 1, wherein the system module comprises a setting program configured to process the digital information generated by the non-intrusive data-extraction system, and select all or a pan of the digital information, and then combine a post-processed customized screen with the original operation screen of the machine control program and add an extra control component into the original operation screen of the machine control program, wherein the control component includes a dialog box, a button or a data list, and the control component is linked to a specific processing function.

5. The system module according to claim 1, wherein the system module is configured to receive a control signal inputted from the keyboard/mouse for processing, and when the system module receives a command of a keyboard input, a primary program of the system module performs an input operation according to press operation of the keyboard;

wherein when the system module receives a command of a mouse moving, the primary program of the system module updates a position of a mouse cursor according to a movement of the mouse; and wherein when the system module receives a command of a mouse clicking, the primary program of the system module transmits commands of the mouse moving and the mouse-clicking to the primary program for processing, and the system module transmits a control signal in response to the commands of the keyboard input, the mouse moving and the mouse clicking on the control component to the machine controller.

6. A method of customizing a screen image based on a non-invasive data-extraction system, wherein the method is applicable to a machine controller, and the machine controller is configured to control a machine, and the machine is provided with a plurality of sensors disposed inside and outside thereof, the machine controller is electrically connected to a system module, wherein the system module are configured to:

receive an image of an original screen of a machine control program outputted from the machine controller, and transmit the image of the original screen to a non-invasive data-extraction system for extracting information shown on the original screen;

integrate the data measured by the plurality of sensors with the information shown on the image of the original screen, and combine an integration result with a customized screen, and embed an extra control component in the original operation screen of the machine control program outputted by the machine controller;

output the customized screen to the machine controller;

transmit a keyboard/mouse control signal inputted by the machine controller to the software control system for processing; and simulate the keyboard/mouse to transmit a corresponding control signal to the machine controller, and the method comprises:

determining information to be displayed, wherein the information comprises information shown on an original screen image of the machine control program and the data measured by the plurality of sensors;

planning a screen image to be displayed, wherein the screen image is the original screen image from the machine control program or a customized screen combined with an integration of the data measured by the plurality of sensors and the information shown on the original screen image;

providing a user interface to plan the customized screen, wherein the user interface is configured to combine the original operation screen of the machine control program and embed an extra control component; and confirming a function provided on the customized screen to satisfy a specification.

7. The method according to claim 6, wherein a setting program built-in the system module is configured to process the digital information generated by the non-invasive data-extraction system, select all or a part of the digital information, and combine the customized screen which is post-processed already, with the original operation screen of the machine control program, and embed an extra control component in the machine control program, and the control component comprises a dialog box, a button or a data list, and the control component is linked to a specific processing function.

8. The method according to claim 7, wherein the setting program of the system module displays the information from the machine on a dashboard, or marks the data measured by the plurality of sensors on a 3D model of the machine at positioning corresponding to the plurality of sensors, and integrate the digital information shown on the image of the original screen with the 3D model of the machine.

9. The method according to claim 6, wherein the system module receives the control signal inputted by the keyboard/mouse for processing, and when the system module receives a command of a keyboard input, a primary program of the system module perform input operation according to press operation of the keyboard;

wherein when the system module receives a command of a mouse moving, the primary program of the software control system updates the position of a mouse cursor according to the command of the mouse moving; and wherein when the system module receives a command of a mouse clicking, the primary program of the system module transmits a current position of the mouse cursor and the command of the mouse clicking to the primary program for processing, and the system module transmits a control signal in response to the commands of the keyboard input, the mouse moving and the mouse clicking on the control component to the machine controller.

* * * * *